United States Patent Office 3,413,253
Patented Nov. 26, 1968

3,413,253
STABILIZING DIENE RUBBERS
Harry W. Kilbourne, St. Albans, W. Va., assignor to Monsanto Company, St. Louis, Mo., a corporation of Delaware
No Drawing. Filed Oct. 27, 1965, Ser. No. 505,414
3 Claims. (Cl. 260—29.7)

ABSTRACT OF THE DISCLOSURE

Rubbers are stabilized against deterioration by the addition of a small amount of the higher condensation products obtained in the acid-catalyzed reaction of p-phenetidine and acetone.

This invention relates to stabilizing sulfur-vulcanizable diene polymer rubbers which contain a major proportion of a diene hydrocarbon.

The raw polymers of rubber, whether natural or synthetic, must be protected from polymerization, cross-linking and resultant hardening of the raw polymers during processing and storage. Apparently oxygen of the atmosphere promotes this hardening of the raw polymer. It is common practice to incorporate a preservative or stabilizer into the raw polymer at the plantation or site of manufacture.

An object of this invention is to provide a non-volatile stabilizer for the raw polymers of diene rubbers. A further object of the invention is to provide a stabilizer for diene rubbers which effectively inhibits polymerization, cross-linking and resultant hardening in the raw polymer. Other objects of the invention become apparent as the description proceeds. These objects are accomplished by adding to the raw polymer a small amount of the higher condensation products obtained in the acid-catalyzed reaction of p-phenetidine and acetone.

The stabilizer is prepared by the acid-catalyzed condensation of p-phenetidine and acetone. The reaction is carried out in a 500 ml., round-bottom flask equipped with a condenser and stirrer. One mole (137.18 grams) of p-phenetidine and about 0.1 mole (17.2 grams) of toluene sulfonic acid are added to the flask. The mixture is heated to a temperature between 100° and 120° C. Acetone is added to the mixture slowly at a temperature between 120° and 160° C. The reaction is stirred until 2 moles of the acetone reacts with the p-phenetidine or until the p-phenetidine concentration is less than 1%. Iodine, bromine and benzene sulfonic acid are examples of catalysts suitable for the reaction described. The stabilizer of this invention and 6-ethoxy-1,2-dihydro-2,2,4-trimethylquinoline are the products of the reaction. The stabilizer is isolated by distilling the mixture up to 200° C./1–10.00 mm. Hg which removes most of the 6-ethoxy-1,2-dihydro-2,2,4-trimethylquinoline and lower boiling materials. The mixture remaining after this distillation is composed essentially of the condensation products of the reaction which require relatively higher temperatures for distillation than the 6-ethoxy-1,2-dihydro-2,2,4-trimethylquinoline. An assay shows that the mixture is composed of about 10–15% catalyst residue, 5–15% of the quinoline and 70–85% higher boiling amines of varying molecular weight. The molecular weight of these amines is two to three times greater than the molecular weight of the quinoline. The invention includes a base-treated mixture of higher condensation products of the reaction of p-phenetidine and acetone. The mixture composed predominantly of condensation products which boil higher than the quinoline is the stabilizer of this invention. The language "higher condensation products" of the claims is used in this sense.

Table I illustrates properties of the new stabilizer in styrene-butadiene copolymer rubber coagulated from SBR 1500 latex containing 23.5% bound styrene, no stabilizer, 19.9% solids and employing 1.2% stabilizer based on the dry rubber content. The dispersion is coagulated by adding 12.5% NaCl solution followed by 0.2% sulfuric acid, and the coagulum is washed and dried. Samples of the rubber are then aged in a circulating air oven at 100° C. for the indicated times, and the viscosity of specimens before and after aging is determined by a Mooney plastometer. The instrument is described by Mooney, Industrial & Engineering Chemistry, Analytical Ed., Mar. 14, 1934, pp. 147–151, and the test procedure follows American Society for Testing and Materials method D–1646–63. The stabilizer polymer is compared to a polymer which has not been treated with stabilizer. The viscosity of the unstabilized polymer increases rapidly upon aging. The stabilized product forms no resinous skin. The 48-hour reading is actually lower than the unaged specimen, probably of a mild peptizing action. The differences between viscosities before and after aging are a measure of the stabilizing action. Little or no increase indicates high stabilizing activity. The hardness test determines the indentation of rubber by means of a durometer. Higher numbers indicate harder rubber. The results are reported in Table I.

TABLE I

| Stabilizer | Mooney Viscosity at 100° C. before aging | Mooney Viscosity at 100° C. after aging | | Hardness, Shore A | | |
|---|---|---|---|---|---|---|
| | | 24 hrs. | 48 hrs. | Initial | Aged 24 hrs. at 100° C. | Aged 48 hrs. at 100° C. |
| None | 51 | 113 | 103 | 15 | 25 | 27 |
| 1.2 phr.[1] stabilizer of this invention | 54 | 60 | 42 | 20 | 20 | 22 |

[1] Parts per hundred rubber.

Table II illustrates the antidegradant properties of the stabilizer of this invention which are carried over into the natural rubber vulcanizate. These properties are shown by comparison of the aged and unaged stress-strain data of the vulcanizates. The modulus of elasticity is the tensile stress as described by the American Society for Testing and Materials method D–412–62T. The tensile strength is the maximum tensile stress applied during stretching a specimen to rupture. The elongation is the increase in gage length of a tension test specimen expressed as percentage of the original gage length. The composition for Table II is as follows:

|  | Parts |
|---|---|
| Smoked sheet | 100.0 |
| Carbon black | 50.0 |
| Stearic acid | 3.0 |
| Pine tar | 2.0 |
| Sulfur | 3.0 |
| N-cyclohexyl-2-benzothiazole sulfenamide | 0.8 |

Stock 1 is the control and stock 2 contains 1.5 phr. of the stabilizer of this invention.

TABLE II

|  | Stocks | |
| --- | --- | --- |
|  | 1 | 2 |
| Stress-Strain Data, Unaged: | | |
| Modulus of Elasticity in lbs./in.² at 300% elongation | 2,840 | 2,770 |
| Ultimate Tensile Strength, lbs./in.² | 3,800 | 4,000 |
| Ultimate Elongation, Percent | 400 | 440 |
| Stress-Strain Data, Aged: | | |
| Aged 48 hrs. at 100° C.: | | |
| Ultimate Tensile Strength, lbs./in.² | 1,250 | 2,340 |
| Ultimate Elongation, Percent | 220 | 280 |
| Aged 72 hrs. at 100° C.: | | |
| Ultimate Tensile Strength, lbs./in.² | 730 | 1,320 |
| Ultimate Elongation, Percent | 150 | 220 |
| Aged 4 hrs. at 121° C. in Air Bomb: | | |
| Modulus of Elasticity in lbs./in.² at 300% Elongation | | 2,140 |
| Ultimate Tensile Strength, lbs./in.² | 1,220 | 2,180 |
| Ultimate Elongation, Percent | 250 | 300 |

The stock containing the stabilizer of this invention retains 58% of its tensile strength on aging 48 hours and 33% on aging 72 hours. In contrast, the control stock shows a 33% retention of tensile strength on aging 48 hours and a mere 19% on aging 72 hours. Comparable results to those exemplified in Table II are obtained with styrene-butadiene rubber.

The stabilizer of this invention can be base treated. It is dissolved in a solvent and lime is added to the mixture. The solids are filtered. The acid salts are filtered out with the lime. A polymer containing the base-treated stabilizer does not cure quite as fast as one containing stabilizer which has not been base treated. Thus, the tendency to scorch is reduced by base treating the stabilizer.

Concentrations of 0.5 to 5 parts stabilizer are effective stabilizing amounts for this invention.

The stabilizers of this invention protect sulfur-vulcanizable diene polymer rubbers. The synthetic rubbers included in this invention are prepared by polymerizing an aliphatic conjugated diene compound; for example, butadiene, isoprene, piperylene, dimethylbutadiene, ethylbutadiene, either alone or as the major component with mono-olefinic compounds as the minor component which contains the $CH_2=C<$ group. Examples of suitable mono-olefins are styrene, alpha-methylstyrene, monochlorostyrene, dichlorostyrene, vinyl naphthalene, vinyl biphenyl, vinyl carbazole, 2-vinyl-5-ethyl pyridine and methyl vinyl ketone. These synthetic rubbers include polybutadiene, cis-polybutadiene, cis-polyisoprene and butadiene-styrene copolymer rubber.

It is intended to cover all changes and modifications of the examples of the invention herein chosen for purposes of disclosure which do not constitute departures from the spirit and scope of the invention.

What is claimed is:

1. A method of stabilizing sulfur-vulcanizable diene polymer rubber which comprises adding thereto a stabilizing amount of a stabilizer consisting essentially of the higher condensation products obtained in the acid-catalyzed reaction of p-phenetidine and acetone which do not distill up to 200° C./1–10.0 mm. Hg.

2. The method of claim 1 wherein the stabilizer is added to the latex of styrene-butadiene copolymer rubber.

3. The method of claim 1 wherein the rubber is natural rubber.

References Cited
UNITED STATES PATENTS 3,163,616  12/1964  Stahly _____ 260—45.9
3,310,583  3/1967  Butts et al. _____ 260—45.9

MURRAY TILLMAN, *Primary Examiner.*

W. J. BRIGGS, Sr., *Assistant Examiner.*